May 30, 1967
M. E. CRIFFIELD
3,321,921
CONTROL MECHANISM
Filed May 25, 1964
2 Sheets-Sheet 1
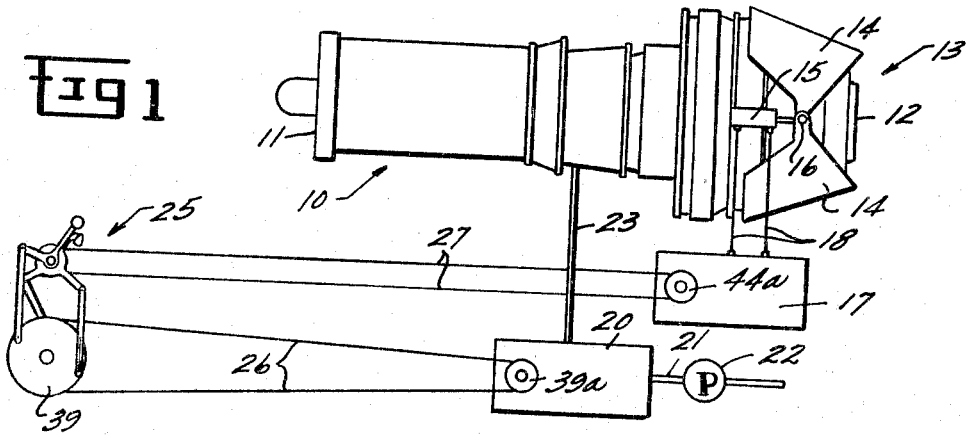
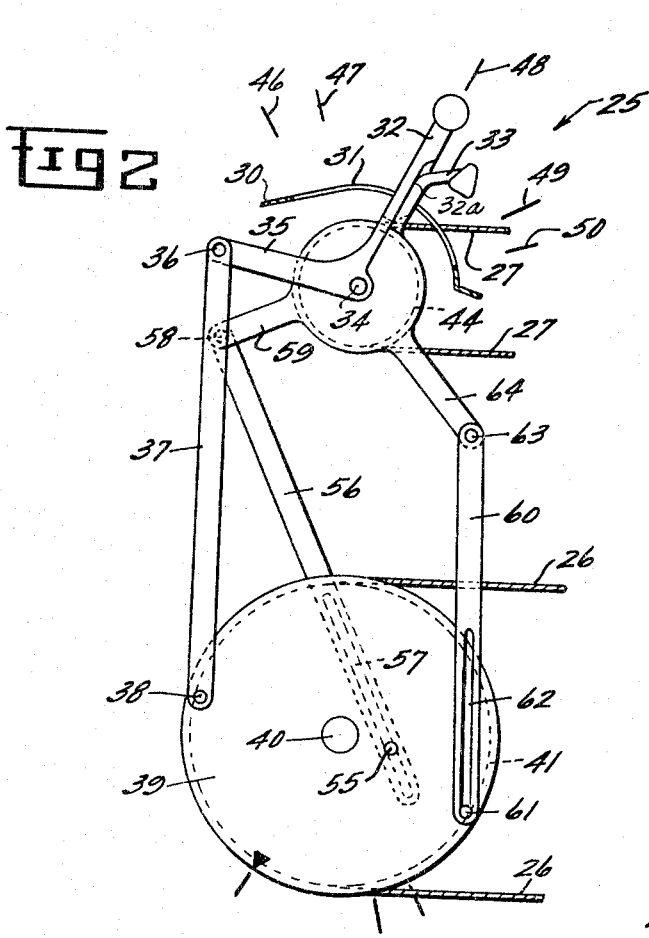
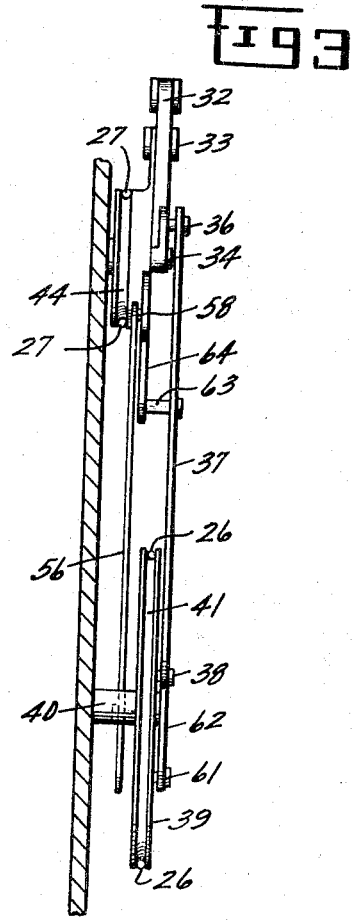
INVENTOR.
MELVIN E. CRIFFIELD
BY Gerald L Moore
ATTORNEY

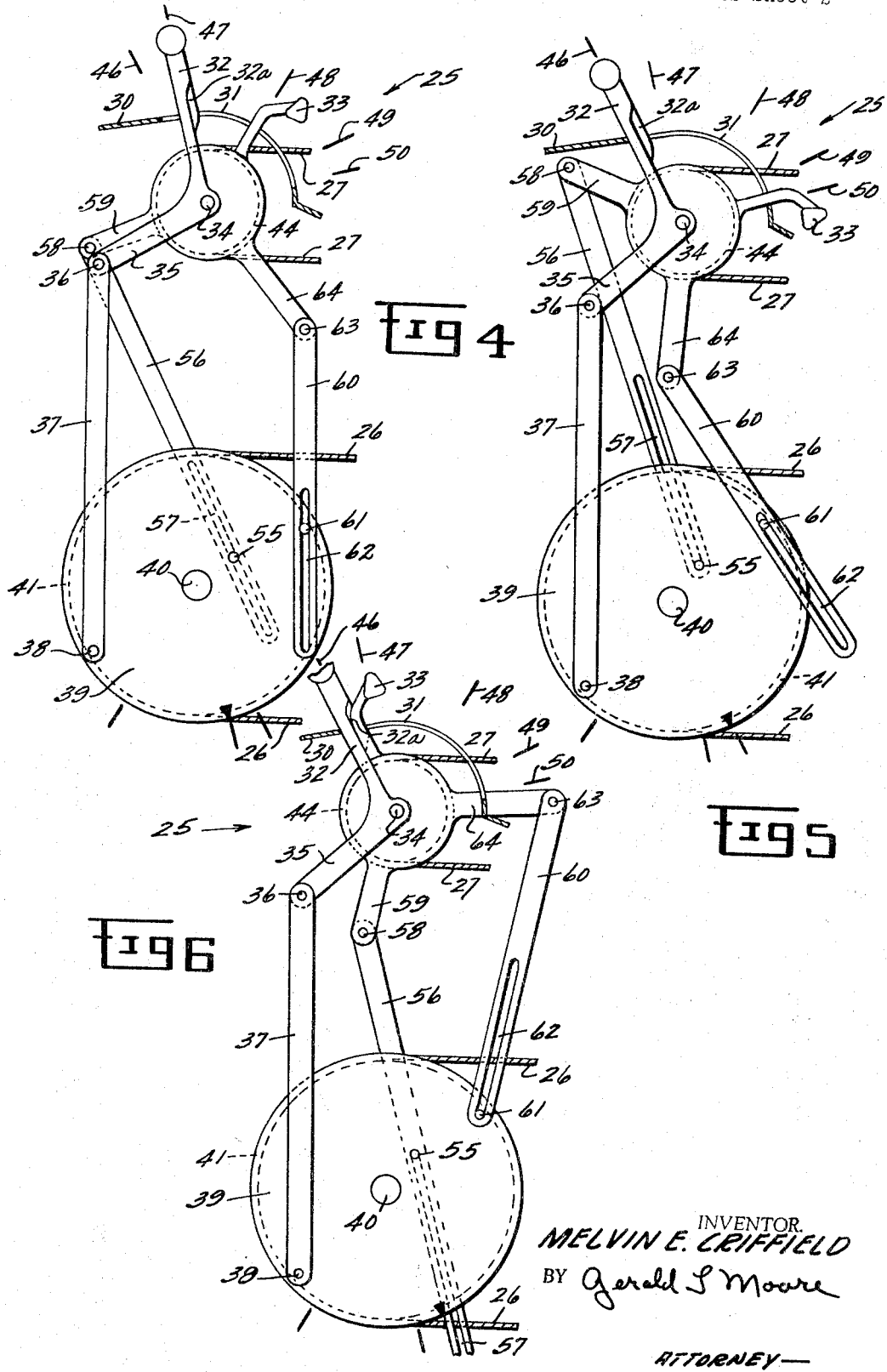

United States Patent Office 3,321,921
Patented May 30, 1967

3,321,921
CONTROL MECHANISM
Melvin Eugene Criffield, Cincinnati, Ohio, assignor to General Electric Company, a corporation of New York
Filed May 25, 1964, Ser. No. 369,812
10 Claims. (Cl. 60—235)

This invention relates to a control mechanism which allows coordination of two or more functions, for instance, the control of fuel input and the thrust reverser actuation of a turbojet.

In the control of machines, for instance, the control of machine tools, the vehicles and specifically turbojet aircraft, it is frequently necessary to not only manually control two functions of the machine but to coordinate the control of these two functions in a manner by specifically programming the actuation of the controls for proper operation of the mechanism.

For instance, on a turbojet powered aircraft it is normal practice to have a fuel control lever which is moved forward to increase the fuel supply to the turbojet engine and thus increase the propulsive thrust of the aircraft, and conversely is moved rearward to reduce the fuel supply and thus reduce the propulsive thrust. With an aircraft driven by turbojet thrust and provided with a thrust reverser for reversing the direction of thrust to act as a brake, for example while landing, the control of the thrust reverser actuation must be coordinated with the fuel control. Furthermore, it is advantageous to allow rearward movement of the control to actuate the thrust reverser to a reverse thrust position.

In the past, for each turbojet engine there has been provided two levers—one for controlling the fuel input to the turbojet and the other for controlling the actuation of the thrust reverser. The pilot was required to manually coordinate the manipulation of these two levers for proper operation of the aircraft, for example the thrust reverser should not be actuated from the stowed to the reverse thrust position or vice versa unless the turbojet engine speed is reduced a sufficient amount to decrease the output thrust below that which the thrust reverser mechanism is designed to withstand while being translated from one position to another since during translation it must be moved through the turbojet exhaust stream. Also in the present controls if it is necessary to abort a landing or take-off, which naturally must be done in a minimum elapsed time period, with present controls the pilot is required to first reduce fuel input to the turbojet engine by actuation of the throttle levers, then by other control levers translate the thrust reverser mechanism by moving the thrust reverser control and waiting until the thrust reverser had reached a stationary stowed position, and thereafter increase the fuel input to the turbojet by further movement of the throttle levers to complete the aborting maneuver. Naturally much depends upon the skill of the pilot in successfully coordinating and completing such a maneuver.

It is therefore one object of this invention to provide a control allowing individual actuation of a plurality of control levers while providing interconnections for the levers in a manner to assure precise coordination of their actuation, It is another object of this invention to provide a control for a turbojet engine providing coordinating actuation between two pilot actuated levers for a minimum control movement by the pilot, It is another object of this invention to provide a combination of throttle and thrust reverser actuating levers for a turbojet engine which requires movement of only the thrust reverser lever while thrust reverser actuation is required and by interconnecting means the throttle lever is actuated responsive to the thrust reverser lever actuation for proper coordination of the two levers.

In accordance with one embodiment of this invention there is provided a turbojet engine control utilizing interconnected throttle and thrust reverser control levers wherein movement of the throttle lever may be effected without affecting the actuation of the thrust reverser, while actuation of the thrust reverser control lever in addition to positioning the thrust reverser does, by interconnecting means between the thrust reverser control lever and throttle lever, position the throttle for optimum operation of the turbojet engine during thrust reverser translation and reverse thrust operation of the turbojet.

Other objects and many of the attendant advantages of this invention will be readily appreciated as the same becomes better understood by reference to the following detailed description when considered in connection with the accompanying drawings wherein:

FIG. 1 is a schematic of a turbojet engine with related fuel and thrust reverser controls of the subject invention;

FIG. 2 is an enlarged plan view of the subject turbojet control with the throttle set at the idle position and thrust reverser control lever in the reverser stowed position;

FIG. 3 is an end view of FIG. 2;

FIG. 4 is a plan view of the subject turbojet control with the throttle actuated to an intermediate thrust position and the thrust reverser control lever in a reverser stowed position;

FIG. 5 is a plan view of the subject turbojet control with the throttle actuated to an advanced thrust position and the thrust reverser control lever actuated to a thrust reversing position; and FIG. 6 is a plan view of the subject turbojet control wherein the thrust reverser control lever is actuated to a forward thrust position advancing the throttle to increase the turbojet forward thrust.

Referring now to FIG. 1 therein is illustrated a turbojet engine 10 having an inlet 11 and an exhaust nozzle 12. Positioned adjacent the exhaust nozzle is a thrust reverser 13 having blocker doors 14 which are illustrated in the stowed position in the drawing but which may be actuated by an actuator 15 to pivot about the support 16 to block the path of the exhaust expelled from the exhaust nozzle 12 and cause it to be deflected to a forward thrust direction or in the direction of the inlet 11 for braking purposes. One thrust reverser of this type is illustrated and described in U.S. Patent 3,024,605, Nash, which is assigned to the same assignee.

A thrust reverser control 17 is provided connected by lines 18 to the thrust reverser actuator 15 for controlling the position of the thrust reverser. A fuel control 20 is also provided connected by a fuel line 21 to a pump 22 leading from a fuel supply (not shown) with an additional fuel line 23 leading from the fuel control 20 to the engine for controlling the fuel input to the engine. For pilot control of both the fuel control 20 and the thrust reverser control 17 the control lever mechanism 25 is provided. This control lever mechanism is connected for actuation of the fuel control 20 by the control lines 26 and connected for actuation of the thrust reverser control 17 by the control lines 27. The pilot or operator would normally be positioned to the right and facing the control levers.

*Throttle control mechanism*

In FIGS. 2 and 3 control lever mechanism 25 is illustrated in enlarged detail comprising a pedestal cover 30 having a slotted portion 31 through which extends a throttle lever 32 and a thrust reverser control lever 33. As illustrated, these levers may include different shaped knobs or handles which the pilot may recognize by sensing their shape without visual identification. The throttle lever 32 extends to the supporting pivot 34 with a lever 35 forming an extension of this lever and extending on the opposite side of the pivot 34 such that by movement of the throttle 32 about the pivot 34 lever 35 pivots in a like manner about that pivot. A link 37 is pivotally attached by pivot pin 36 to the arm 35 and in turn is attached by pivot pin 38 to the rotary member or rotor 39 supported on pivot 40. Control line 26 extends around this rotor such that it moves with the rotor for actuation of the fuel control 20 where it extends around a similar rotor 39a. As the throttle lever 32 is moved forward and rearward the connecting link 37 will pivot the rotor 39 about the pivot 40 corresponding to the movement of the throttle lever 32 for movement of the control line 26 actuating the fuel control 20. An advancing movement of throttle lever 32 in the counter-clockwise direction increases the fuel input supplied through the fuel control 20 to the turbojet engine for increased thrust from the turbojet and a retarding or reverse movement of the throttle reduces the fuel input.

Thrust reverser control mechanism

Turning now to the thrust reverser mechanism the thrust reverser control lever 33 is pivotally supported from the pivot pin 34 and includes a rotor or rotary member 44 around which passes a control line 27 extending to a corresponding rotor 44a on the thrust reverser control 17. Movement of the control lever 33 rotates the wheel 44 to move the control line 27 and impart a signal to the control 17 to cause actuation of the thrust reverser 13. This control functions in a manner such that a retarding or clockwise movement of the control lever 33 from the position illustrated in FIG. 2 actuates the thrust reverser to the reverse thrust position and advancing the control lever forward or counter-clockwise to the position of FIG. 2 moves the thrust reverser to the stowed or forward thrust position.

To coordinate the actuation of the two levers to assure that each is in the optimum position when the other is moved to a new position for a different mode of operation for the turbojet or machine being controlled, interconnecting links between the throttle and thrust reverser lever are provided. Referring to FIGS. 2 and 4, the arc through which the levers may be moved is graduated by lines numbered 46 through 50. The lines 46 through 48 represent the arc of movement of the throttle lever 32 while the lines 46 through 50 represent the arc through which the thrust reverser control lever 33 may be moved. The throttle lever in position 48 is in the idle position and position 46 is the full thrust position representing maximum fuel input to the turbojet. For the thrust reverser control, position 50 is full powered reverse thrust, position 49 is reverse thrust position of the thrust reverser, position 48 is forward thrust for stowed thrust reverser position and between positions 48 and 46 is represented the fuel actuation position. Connecting the thrust reverser mechanism and the throttle mechanism is a link 56 extending from the pivot pin 58 connecting it to extension 59 of the thrust reverser control lever 33 and wheel 44 to the rotor 39 where a pin 55 extends through a slot 57 in the link. The rotor 39 is also connected to a link 60 by pin 61 extending through a slot 62 in the link with this link extending to and fastened by pin 63 to the arm 64 forming an extension of the thrust reverser control lever 33 and wheel 44.

Control Operation

As explained before, it is necessary that the levers be moved forward to signal forward movement of the apparatus or aircraft and rearward to signal slowing or stopping of the aircraft. In the drawings, forward movement is a counter-clockwise movement of the control levers and rearward is clockwise since the operator or pilot would be positioned to the right and facing the controls in the drawing. Additionally it is necessary that the throttle be set at a thrust output setting no greater than that thrust which the reverser doors are able to withstand while being translated between thrust positions since the doors must be moved through the exhaust jet of the turbojet and are subjected to extreme forces during this period, normally this throttle setting is less than full output thrust for the engine, assume for purposes of this illustration that it is desirable that the throttle not be advanced past position 47 when the doors are being translated. It is also desirable that further movement of the thrust reverser lever rearward past the position where the reverser doors are in the reverse thrust position will increase fuel input to the turbojet to increase the reverse thrust for a greater slowing force on the aircraft.

To explain the operation of the control in accomplishing these functions, first assume the levers are in the position illustrated in FIG. 2, when in this position the reverser doors are in their stowed or forward thrust position and the throttle lever is at idle position or that position effecting just enough fuel input to the turbojet to allow it to operate at idle speed. To increase the forward thrust of the turbojet the throttle lever is moved forward to the position 47 illustrated in FIG. 4 where the turbojet engine is regulated to 100% forward thrust. The throttle may be moved further forward to position 46 if desired where approximately 104% forward thrust is indicated however generally this forward thrust is utilized for short periods of time only therefore this thrust position is indicated as exceeding 100% thrust.

With the control positioned in position 47 as in FIG. 4 assume it is now necessary to control the engine to a reverse thrust position. The thrust reverser control lever is therefore moved rearward to rotate wheel 44 and if the throttle lever 32 is at position 46, the upper end of slot 62 in lever 60 will push downward on pin 61 until levers 64 and 60 align and then pass the overcenter position. This action will rotate rotor 39 counter-clockwise and through levers 37 and 35 move the throttle lever to position 47 corresponding to the maximum throttle position desirable while the reverser doors are translated.

If the throttle is at or rearward of position 47 the movement of lever 33 will not immediately affect the positioning of lever 32 but will rotate wheel 44 to move control line 27 to cause actuation of the thrust reverser doors to the reverse thrust position. When lever 33 is moved to position 49 the doors are now translated to the reverse thrust position, when lever 33 is moved past position 49 the bottom end of slot 57 of link 56 will again contact pin 55 and further movement of lever 33 rearward will rotate rotor 39 counter-clockwise as indicated in FIG. 5 to increase fuel flow to the engine and thereby increase reverse thrust. Naturally pin 55 will encounter the bottom end of slot 57 sooner if lever 32 is positioned rearward of position 47 however in either instance the lever and associated linkages will be moved to increase fuel flow to the engine.

With the lever 33 in the position illustrated in FIG. 5 it is now possible to go to full forward thrust by actuation of this lever only. Movement of lever 33 from position 50 to 49 moves the throttle lever 32 and linkage to position 47 by action of the end of slot 62 of lever 60 pushing on pin 61, movement of lever 33 from position 49 to 48 actuates the thrust reverser to the forward thrust position and movement of the thrust reverser lever 33 on forward causes it to physically contact lever 32 where it interfits within the indented portion 32a to cause lever 32 to be advanced to the full thrust position 46. In this manner the pilot may quickly control the aircraft from full powered reverse thrust to full forward thrust by actuation of lever 33 only.

While particular embodiments of the invention have been illustrated and described, it will be obvious to those skilled in the art that various changes and modifications may be made without departing from the invention and it is intended to cover in the appended claims all such changes and modifications that come within the true spirit and scope of the invention.

What is claimed as new and desired to be secured by Letters Patent of the United States is:

1. A fuel and thrust reverser control for an aircraft turbojet having a fuel control valve and thrust reversing means for reversing the direction of thrust of the engine comprising, in combination:
   a first lever means connected for actuation of said fuel control valve and supported for movement between an idle and full thrust position,
   a second lever means connected for actuation of said thrust reversing means and supported for movement between a fuel actuation position, a forward thrust position, a reverse thrust position and a full reverse thrust position,
   interconnecting means between said first and second lever means such that movement of said second lever means from the forward thrust position toward a reverse thrust position moves said first lever means to a preselected intermediate thrust position if said first lever means is positioned between said intermediate thrust position and said full thrust position when said movement of said second lever means is initiated.

2. A fuel and thrust reverser control as recited in claim 1 wherein movement of said second lever means from a reverse thrust position to a full reverse thrust position moves said first lever means toward said full thrust position.

3. A fuel and thrust reverser control as recited in claim 1 in which said interconnecting means also connects said first and second lever means such that movement of said second lever from said full reverse thrust position to said reverse thrust position moves said first lever to said preselected intermediate thrust position.

4. A fuel and thrust reverser control as recited in claim 1 wherein movement of said second lever means from said forward thrust position to said fuel actuation position moves said first lever means toward said full thrust position.

5. A fuel control and thrust reverser control for an aircraft turbojet having a fuel control valve and thrust reversing means for reversing the direction of thrust of the engine comprising, in combination:
   fuel control lever means for controlling fuel input to said turbojet,
   means for movably supporting said fuel control lever means,
   means adapted to transmit fuel control lever movement to said fuel control valve, said movement being between idle and full thrust positions,
   thrust reverser control lever means,
   means for supporting said thrust reverser control means,
   means adapted to transmit thrust reverser control lever movement to said thrust reversing means, said movement being between a fuel actuation position, a forward thrust position, a reverse thrust position and full reverse thrust position,
   interconnecting means between said fuel control and thrust reverser control lever means such that movement of said thrust reverser lever means will cause movement of said fuel control lever means at preselected positions,
   said interconnecting means connecting said levers such that when said thrust reverser control lever is moved from the forward thrust position toward said reverse thrust position said fuel control lever means is moved to a preselected intermediate fuel input and when said thrust reverser control lever is moved past said reverse thrust position toward said full reverse thrust position said fuel control lever is moved to increase fuel input to the turbojet.

6. A fuel control and thrust reverser control as claimed in claim 5 in which said interconnecting means also connects said control lever means such that movement of said thrust reverser control lever from said full reverse thrust position to said reverse thrust position said fuel control lever means is moved to said preselected intermediate thrust position and when said thrust reverser control lever is moved from said forward thrust position to said fuel actuation position said fuel control lever means is moved to increase fuel input to the turbojet.

7. A control for a turbojet engine having fuel input means and a thrust reverser means comprising:
   a movable fuel control mechanism supported for rearward and forward movement for controlling said fuel input means,
   a movable thrust reverser control mechanism supported for rearward and forward movement for controlling said thrust reverser means,
   said control mechanisms being connected to said means such that forward movement of said fuel control mechanism increases fuel input to said turbojet engine and rearward movement of said thrust reverser control mechanism actuates said thrust reverser from a forward to a reverse thrust position,
   and interconnecting means connecting said mechanisms such that continued rearward movement of said thrust reverser control mechanism beyond a predetermined range moves said fuel control mechanism forward.

8. A control for a turbojet engine as recited in claim 7 wherein continued forward movement of said thrust reverses control forward of that position actuating said thrust reverser to a forward thrust position will move said fuel control mechanism forward.

9. In an aircraft turbojet having a fuel control, means for reversing the thrust of the engine and control means therefor,
   a fuel control lever, said lever being operatively connectable to said fuel control and movable between minimum and maximum fuel flow positions,
   a thrust reverser lever movable in one direction from an "initial" position to a first position, said reversing control means being responsive to such movement to bring the reversing means to a full thrust reverse position, said reverser lever being movable past said first position to a second position, said fuel control means being responsive to said last named movement to increase fuel flow and provide powered thrust reversal.

10. The combination of claim 9 wherein,
   said reverser lever being movable in the other direction from said second position past said initial position to a third position, said reverser control means being responsive to movement in said other direction toward said initial position to bring the thrust reverser means to an inoperative position, said fuel control means being responsive to movement of said reverser lever beyond said initial position to increase fuel flow,
   whereby the same single lever may be employed when it is desired to rapidly change the thrust output of the engine and provide full forward thrust.

References Cited

UNITED STATES PATENTS

| | | | |
|---|---|---|---|
| 2,409,231 | 10/1946 | Waite | 74—471 |
| 2,435,037 | 1/1948 | Gardiner et al. | 74—471 |
| 2,932,164 | 4/1960 | Watson | 60—35.54 |
| 2,999,355 | 9/1961 | Fishpaw et al. | 60—35.54 |

JULIUS E. WEST, *Primary Examiner.*